P. F. BOEYE

Nov. 10, 1931. BOX Re. 18,245

Original Filed Oct. 15, 1928 2 Sheets-Sheet 1

Inventor

Paul-F-Boeye

By Alex. Lagaard

Attorney

April 21, 1931.

P. F. BOEYE

BOX

Re. 18,245

Original Filed Oct. 15, 1928 2 Sheets-Sheet 2

Inventor

Paul F. Boeye

By Alex. Lagaard

Attorney

Reissued Nov. 10, 1931 Re. 18,245

UNITED STATES PATENT OFFICE

PAUL F. BOEYE, OF ST. PAUL, MINNESOTA, ASSIGNOR TO WALDORF PAPER PRODUCTS COMPANY, OF ST. PAUL, MINNESOTA, A CORPORATION OF MINNESOTA

BOX

Original No. 1,801,998, dated April 21, 1931, Serial No. 312,533, filed October 15, 1928. Application for reissue filed September 17, 1931. Serial No. 563,422.

My invention relates to paper boxes and particularly to dividers used in conjunction therewith and has for its object to provide a removable divider together with a box constructed to retain the position of the divider therein, which box may be used with or without the divider, as desired.

Another object resides in constructing the divider with a base and a divider member issuing outwardly therefrom, one of the walls of said box being grooved to receive the base of said divider for retaining the same in proper position within the box.

A still further object of the invention resides in constructing said divider from sheet material and in bending the same to provide a doubled over divider member with base members bent out from the lowermost edge of the divider member in opposite directions.

A still further object of the invention resides in bending up the extreme edges of said base member to provide additional divider members extending in the same general direction as the doubled over divider member.

A feature of the invention resides in employing oppositely disposed dividers positioned at opposite sides of the box and spaced from one another and in further disposing between said dividers another divider, said last named divider being supported upon one of said first named dividers and held in its intermediate position thereby, and, in turn, serving to hold said first dividers in place.

Other objects of the invention reside in the novel combination of parts and in the details of construction hereinafter described and illustrated in the drawings.

In the use of paper boxes for packing various materials for shipment it frequently becomes desirable to provide removable dividers in connection with the same which may be inserted and retained in position when certain commodities or articles are to be boxed and which may be entirely removed from the boxes when other commodities are to be contained within the same. At the same time, it is highly desirable to employ a divider which may be properly positioned within the box and which at the same time occupies a minimum amount of space and does not materially add to the cost of the box. My invention serves to meet with these requirements providing a simple and effective divider which may be quickly installed within the box or removed therefrom, as the occasion requires, and which can be constructed at a nominal cost.

Figure 3:
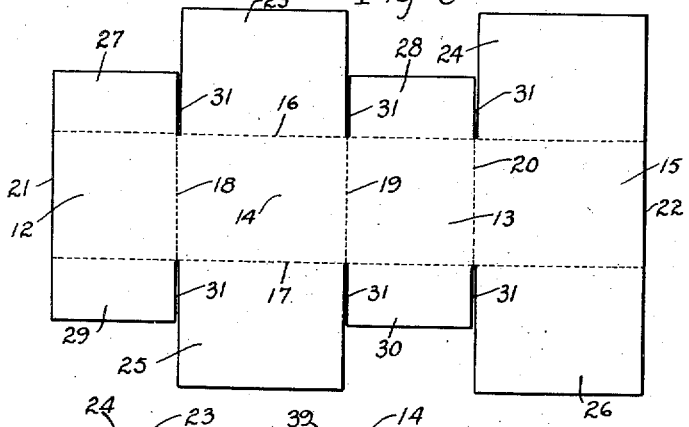
Fig. 3 is a developed view of the blank from which the box is constructed.
Figure 1:
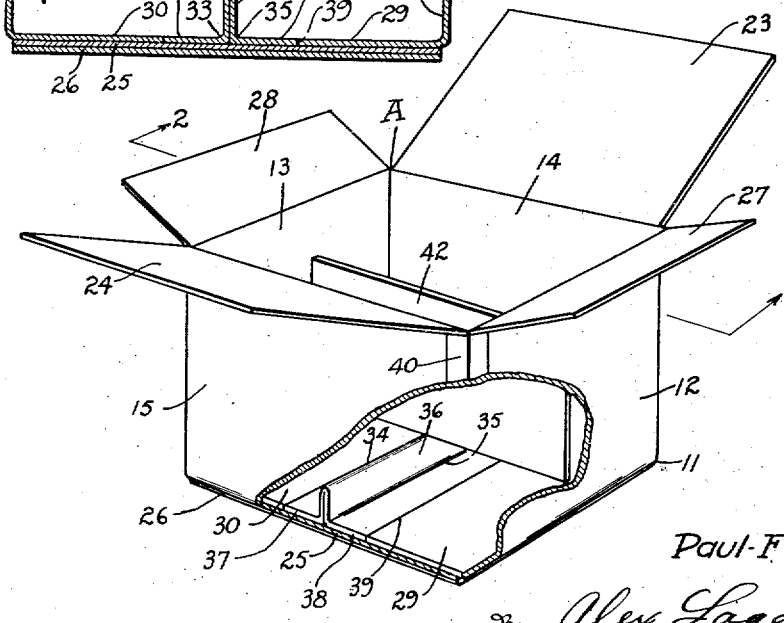
Fig. 1 is a perspective view of a box with the cover thereof open and portions broken away and illustrating an embodiment of my invention.
Figure 8:
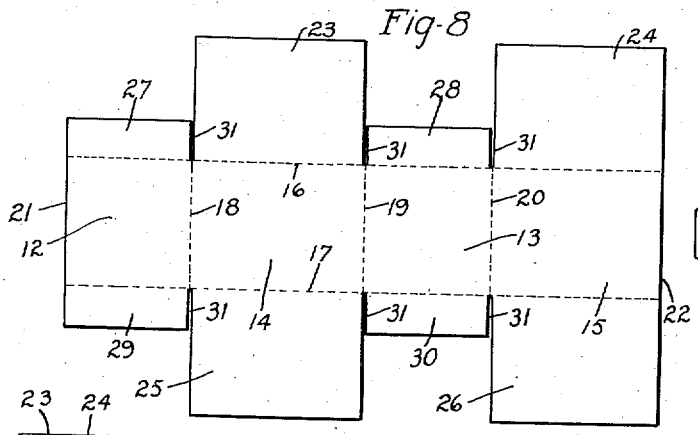
Fig. 8 is a developed view of the blank from which the box shown in Fig. 6 is constructed.

For the purpose of my invention, I have shown in Fig. 1 a box A comprising a body portion 10 which is constructed from a blank 11 formed from a single sheet of material, such as indicated in detail in Fig. 3. The body 10 comprises end walls 12 and 13 and side walls 14 and 15 which are formed by scoring the blank 11 along two longitudinal lines 16 and 17 and along three transverse lines 18, 19 and 20. The box is formed by folding the blank along the score lines 18, 19 and 20 and bringing the edges 21 and 22 thereof together at a corner of the box. These edges may be secured together as by gluing a reinforcing strip 40 along the corner of the box or by metal clips or by gluing overlapping portions formed on the walls 12 and 15 of the box or in any suitable manner.

A number of flaps 23, 24, 25 and 26 extend outwardly from the edges of the sides 14 and 15 of the box, while similar flaps 27, 28, 29 and 30 extend outwardly from the edges of the ends 12 and 13 of the box. These flaps are formed by severing the stock of the blank 11 along lines 31 which are in alignment with the score lines 18, 19 and 20 and which extend from the edge of the stock up to the score lines 16 and 17. These various flaps are adapted to be folded inwardly at right angles to the side and end walls of the box to provide top and bottom closures therefor.

Figure 4:
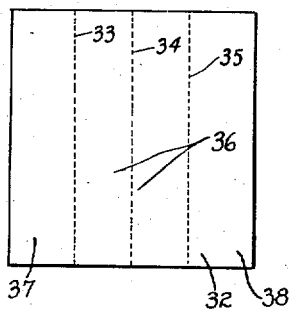
Fig. 4 is a developed view of one of the dividers used in conjunction with my invention.

The divider used in conjunction with the box shown in Fig. 1 is formed from a blank 32 such as is illustrated in detail in Fig. 4. This blank is scored along equally spaced lines 33, 34 and 35 and doubled back upon itself along the score line 34 to provide an outwardly extending tab or divider member 36. The said blank is further folded along the score lines 33 and 35 to provide base members 37 and 38 adapted to extend outwardly from the divider member and which lie in a common plane. In the construction of the box A flaps 27, 28, 29 and 30 are made shorter than half the length of the box to provide transverse grooves 39 extending across the box and disposed between the edges of said flaps and the particular flaps of the flaps 23, 24, 25 and 26 which happen to be folded next to the said first named flaps. The base members 37 and 38 of the divider 41 are of such a size as to be snugly received within the slots 39 of which the slot in the bottom serves to temporarily hold one of said dividers in place while the articles to be placed within the box are properly positioned between the said divider and the walls of the box.

Figure 2:
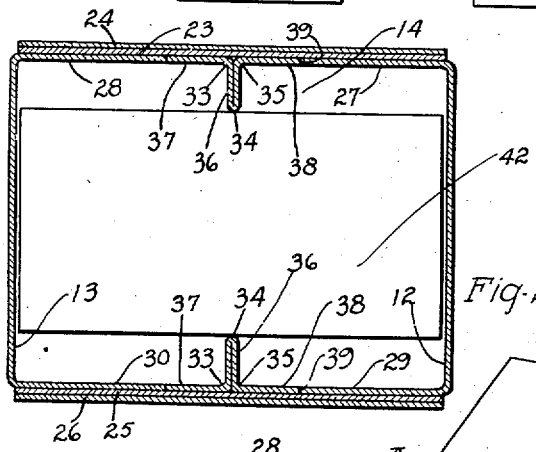
Fig. 2 is a cross sectional view taken substantially along line 2—2 of Fig. 1 with the cover of the box in closed position.
Figure 5:
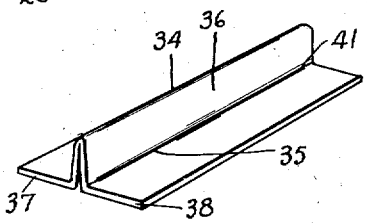
Fig. 5 is a perspective view of one of the dividers used with the box shown in Fig. 1.
Figure 6:
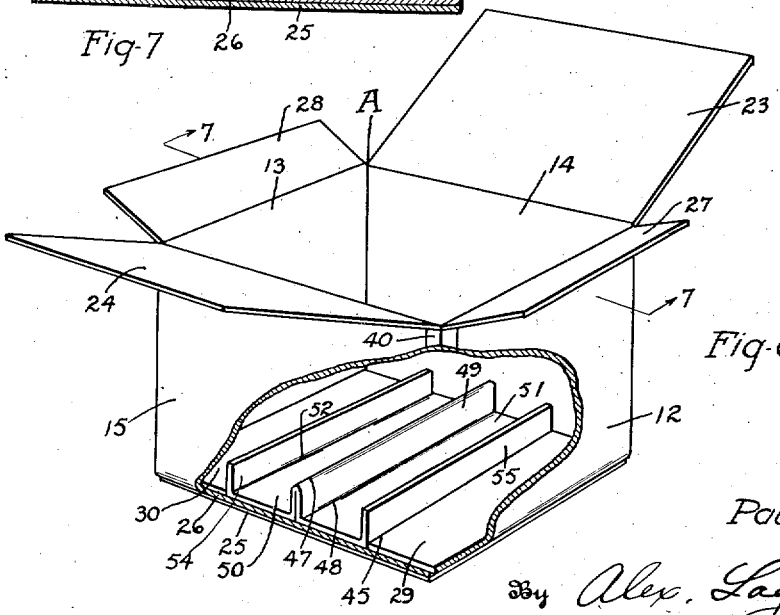
Fig. 6 is a perspective view similar to Fig. 1 illustrating a modification of the invention.

In the use of the device the box may be shipped in knocked-down form by folding the same along diagonal corners. In such case all of the flaps extend outwardly below the body portion and the entire structure lies flat so that the knocked-down boxes may be placed one upon the other and baled if desired. When the box is desired for use the same is folded into rectangular form and the flaps 29 and 30 bent inwardly along score line 17 toward one another to lie in a common plane. The flaps 25 and 26 are next folded along the score line 17 and to overlie the flaps 29 and 30 and are glued to said flaps and to one another to provide a bottom closure for the box. Due to the relative length of the flaps 29 and 30 the groove 39 is formed which is adapted to receive the divider 41. The divider 41 is next folded from planiform shape to that shown in Fig. 5 and the base members 37 and 38 thereof lodged between the edges of the flaps 29 and 30 and within the groove 39. Due to the resiliency of the material from which divider 41 is constructed, the base members 37 and 38 spring outwardly and engage the edges of the flaps 29 and 30 and thereby hold the divided temporarily positioned within the box. The articles to be contained within the box may next be placed within the respective compartments formed by the divider 41 and the walls of the box being separated at their lower portions by means of the said divider. Where the box is designed to receive two articles, another divider similar to the divider 41 is placed between the objects at the top of the box and flaps 27 and 28 next folded in place to receive the base members 37 and 38 of said second divider between the edges thereof. Flaps 23 and 24 are next glued to the flaps 27 and 28 and to one another to form a complete closure for the box. If desired, the various flaps of the box may be secured together by means of reinforcing strips instead of being glued or the same may be secured together by metal clips or fasteners of any desired type.

Where the box is designed to contain four articles another divider, designated at 42, in Figs. 1 and 2, is placed between the articles and extends in a direction at right angles to the divider members 36 of dividers 41. This divider is of a length such that the same is freely received between the ends 12 and 13 of the box and is of a height less than the distance between the two divider members 36 previously referred to. As soon as this divider has been properly positioned, the second divider 41 is installed and the flaps 27 and 28, 23 and 24 folded in and glued together, as previously described. The divider 42 is loosely positioned within the box, being retained in intermediate position by means of the end walls 12 and 13 thereof and by engagement with one or the other of the divider members 36 of dividers 41. This divider also assists in holding the bases of dividers 41 against the top and bottom of the box.

Where four compartments along the length of the box are desired instead of two as shown in Fig. 1, the box and divider therefor may be constructed as disclosed in Figs. 6 to 10 inclusive. In such case the box A, which I have designated at B, is constructed exactly the same as the box A except that the flaps 27 and 28, 29 and 30 thereof are of such a length that the same when brought toward one another, as shown in Fig. 6, leave a groove 43 therebetween of a length equal to substantially one-half the length of the box.

Figure 10:
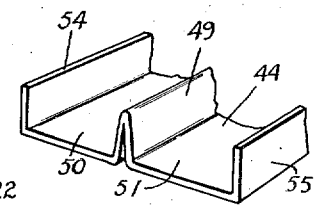
Fig. 10 is a perspective view of one of the dividers used in conjunction with the box shown in Fig. 6.
Figure 7:
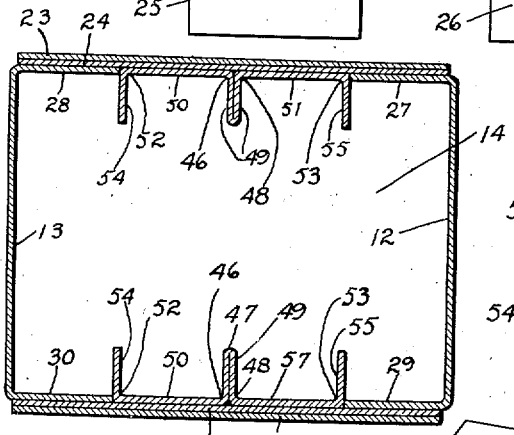
Fig. 7 is a transverse sectional view similar to Fig. 2 and taken on line 7—7 of Fig. 6.
Figure 9:
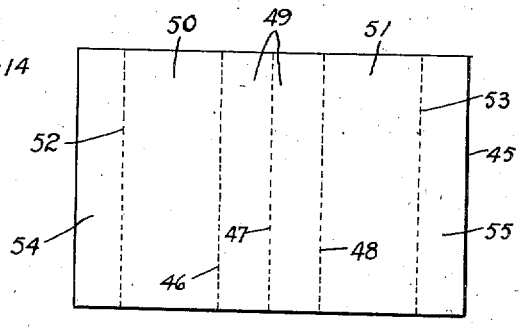
Fig. 9 is a developed view of the blank from which the dividers used in conjunction with the box shown in Fig. 6 are constructed.

In conjunction with the box B a slightly different form of divider is employed, which I have indicated in its entirety at 44 and which is shown in detail in Fig. 10. This divider is constructed from a blank 45 illustrated in Fig. 9 which is provided with three score lines 46, 47 and 48 similar to the score lines 33, 34 and 35 of blank 32 to form a divider member 49 similar to the divider member 36 and base members 50 and 51 similar to the base members 37 and 38. The base members 50 and 51 are considerably longer than the base members 37 and 38 and are scored near their edges along lines 52 and 53. The material of the blank 45 is further bent up along the score lines 52 and 53 to provide parallel upstanding divider members 54 and 55 which are substantially the same height as the divider member 49 and which preferably extend parallel therewith. The base members 50 and 51 of the divider 44 are constructed of such a length as to snugly fit within the groove 43 formed between the edges of the flaps 29 and 30 and serve to divide the interior of the box into four equal compartments.

In the use of this form of the invention the flaps and dividers are assembled in identically the same manner as with the type of the invention shown in Fig. 1 and a second divider identical with the divider 44 employed for the upper end portion of the box. The form of the invention shown in Fig. 6 may also be provided with one or more transverse dividers such as designated at 42 in Fig. 1, depending upon the number of compartments desired and the size and shape of the articles contained within the box.

The advantages of my invention are manifest. The box is extremely simple in construction and can be constructed at an exceedingly low price. The box may be provided with or without dividers so that the use of the box is more or less universal. If desired, the bases of the dividers may be constructed such that use of the two types of dividers may be employed with one box thereby permitting the use of the box for diverse purposes. The dividers can be constructed from small pieces of stock which are ordinarily wasted, thereby greatly reducing the cost of the boxes. The box and dividers can be both readily collapsed to permit of shipment in a compact form.

Although I have shown a particular size and style of box, yet it can be readily comprehended that the box may be constructed in different sizes and shapes to accommodate the particular goods to be disposed within the same. The box embodied in my invention may also be constructed of different kinds of paper or cardboard, depending upon the weight and other characteristics of the articles or commodities for which the box is to be used.

Changes in the specific form of my invention, as herein disclosed, may be made within the scope of what is claimed without departing from the spirit of my invention.

Having described my invention, what I claim as new and desire to protect by Letters Patent is:

1. A box comprising a body portion having four walls, flaps extending from corresponding ends of the four walls of said body portion and toward one another, two of the flaps overlying the other two flaps to form another wall for the box, the facing edges of the innermost of said flaps being spaced from one another, and a divider constructed of sheet material and having a doubled over outstanding divider member, and a pair of base members extending outwardly therefrom and in a common plane, said base members being received between the facing edges of said innermost flaps, said base members being resiliently connected together through the doubled over member of said divider to spring apart and engage the facing edges of said innermost flaps for frictionally holding said divider in place therebetween.

2. A box comprising a body portion having four walls, flaps extending from corresponding ends of the four walls of said body portion and toward one another, two of the flaps overlying the other two flaps to form another wall for the box, the facing edges of the innermost of said flaps being spaced from one another, and a divider constructed of sheet material and doubled over about a longitudinal line to form two juxtapositioned outstanding divider portions, and a base member extending outwardly from one of said outstanding portions at the edge thereof opposite the folded edge of said divider portion, said base being disposed between the facing edges of the innermost flaps and being urged against the facing edge of the adjoining flap through the resiliency of the folded portions of said divider to hold the divider in place between said flaps.

3. A box comprising a body portion having four walls, flaps extending from corresponding ends of the four walls of said body portion and toward one another, two of the flaps overlying the other two flaps to form another wall for the box, the facing edges of the innermost of the said flaps being spaced from one another, a divider comprising two juxtapositioned divider portions connected together and tending to spring apart, and means opposite the connected portions thereof forming a base for said divider for disposition between the facing edges of said innermost flaps, said divider being held in place between said flaps through the springing action of said divider portions.

4. A box comprising a walled body portion, spaced tabs extending from the top and bottom of said body portion toward one another to jointly form dividing means within the box, and a divider within the box extending at right angles to said dividing means and interposed between the tabs thereof, said divider extending in a direction from top to bottom of the box to form in conjunction with said dividing means, four compartments coextensive with the height of the box.

5. A box comprising a walled body portion, spaced tabs extending from opposite walls of said box toward one another to jointly form dividing means within the box running in one direction, a divider extending in a direction at right angles to said dividing means and interposed between the tabs thereof, said divider being of a width less than the distance between said walls and being held in its intermediate position by edge to edge engagement with the free edge of one of said tabs.

6. A box comprising a walled body portion, a divider at the top and a divider at the bottom of the box, the first divider having a base member contacting with the top and the second divider having a base member contacting with the bottom of the box, each divider having an outstanding divider portion projecting inwardly into the box and away from its base member, said divider portions forming in conjunction dividing means extending in one direction across the box and a divider within the box extending at right angles to said dividing means and interposed between said first two dividers, said third divider extending in a direction from top to bottom of the box to form in conjunction with said dividing means a plurality of compartments within the box.

7. A box comprising a walled body portion, dividers at the top and bottom of the box, each constructed of sheet material doubled over on a longitudinal line to form two juxtapositioned outstanding divider portions, said dividers being bent along parallel lines at either side of said longitudinal line to form base members issuing outwardly from said divider portions, the base members of one divider engaging the top of the box and the base members of the other divider engaging the bottom of the box, and a third divider within the box extending at right angles to said first named dividers and engaging said first named dividers for holding the base portions thereof in engagement with the top and bottom of the box, said dividers forming in conjunction with one another a plurality of compartments within the box.

In testimony whereof I have affixed my signature to this specification.

PAUL F. BOEYE.